United States Patent
Schmid et al.

(10) Patent No.: US 10,946,734 B2
(45) Date of Patent: Mar. 16, 2021

(54) PROFILE STRIP FOR A MOTOR VEHICLE AND PROFILE STRIP PRODUCTION METHOD

(71) Applicant: Cooper Standard GmbH, Lindau (DE)

(72) Inventors: Thomas Schmid, Langenargen (DE); Dominik Schramm, Wasserburg (DE)

(73) Assignee: COOPER STANDARD GMBH, Lindau (DE)

( * ) Notice: Subject to any disclaimer, the term of this patent is extended or adjusted under 35 U.S.C. 154(b) by 0 days.

(21) Appl. No.: 16/038,853

(22) Filed: Jul. 18, 2018

(65) Prior Publication Data

US 2018/0319259 A1 Nov. 8, 2018

Related U.S. Application Data

(63) Continuation of application No. PCT/EP2017/050444, filed on Jan. 11, 2017.

(30) Foreign Application Priority Data

Jan. 26, 2016 (DE) ..................... 10 2016 101 312.9

(51) Int. Cl.
*B60J 10/17* (2016.01)
*B60J 10/74* (2016.01)

(52) U.S. Cl.
CPC ............... *B60J 10/17* (2016.02); *B60J 10/74* (2016.02); *Y10T 428/24198* (2015.01); *Y10T 428/24942* (2015.01); *Y10T 428/24983* (2015.01)

(58) Field of Classification Search
CPC ... B60J 10/17; B60J 10/74; Y10T 428/24198; Y10T 428/24942; Y10T 428/24983
See application file for complete search history.

(56) References Cited

U.S. PATENT DOCUMENTS

| 5,267,846 A * | 12/1993 | Miyama ................... B60J 10/00 |
| | | 425/113 |
| 2002/0110663 A1* | 8/2002 | Gopalan .................. B60J 10/17 |
| | | 428/122 |

(Continued)

FOREIGN PATENT DOCUMENTS

| DE | 69908035 T2 * | 12/2003 | .............. B60J 10/17 |
| DE | 69908035 T2 | 12/2003 | |

(Continued)

OTHER PUBLICATIONS

[NPL-1] Natsuyama et al. (DE 69908035 T2); Dec. 11, 2003 (EPO—machine translation). (Year: 2003).*

(Continued)

*Primary Examiner* — David Sample
*Assistant Examiner* — Donald M Flores, Jr.
(74) *Attorney, Agent, or Firm* — Reising Ethington, P.C.

(57) ABSTRACT

A profile strip for a motor vehicle, in particular for a sealing assembly in a window or door area of a motor vehicle. The profile strip comprises a securing profile section that can be secured on a first part of the motor vehicle. The profile strip comprises a sealing profile section connected to the securing profile section, produced from a vulcanized rubber matrix and configured to allow relative movements with reduced friction between the profile strip and a second part of the motor vehicle. A contact surface of the sealing profile section that can be brought into contact with the second part is provided with an anti-friction coating that comprises an anti-friction coating matrix and anti-friction particles embedded in the anti-friction coating matrix that are produced from UHMWPE. The anti-friction coating matrix is a vulcanized EPDM matrix.

20 Claims, 3 Drawing Sheets

(56) References Cited

U.S. PATENT DOCUMENTS

| | | | | |
|---|---|---|---|---|
| 2003/0220411 A1* | 11/2003 | Sakai | ................. | C08L 23/16 |
| | | | | 521/134 |
| 2004/0006170 A1 | 1/2004 | Haftka et al. | | |
| 2007/0175101 A1* | 8/2007 | Kanehara | ................. | B60J 10/50 |
| | | | | 49/441 |
| 2011/0308170 A1* | 12/2011 | Goto | ................. | B60J 10/76 |
| | | | | 49/489.1 |
| 2016/0257044 A1 | 9/2016 | Schramm et al. | | |

FOREIGN PATENT DOCUMENTS

| | | |
|---|---|---|
| DE | 60207527 T2 | 8/2006 |
| DE | 102013109567 B4 | 9/2015 |
| EP | 0978404 B1 | 5/2003 |
| EP | 1342751 B1 | 4/2005 |
| JP | 2000272350 A | 10/2000 |
| WO | WO01/85482 A1 | 11/2001 |

OTHER PUBLICATIONS

Search Report for German Application 10 2016 101 312.9, in German, dated Sep. 19, 2016.
International Search Report Issued for PCT/EP2017/050444 dated Apr. 18, 2017.
German Office Action issued for corresponding application No. DE 10 2016 101 312.9, dated Mar. 4, 2020; 7 pages.

\* cited by examiner

PROFILE STRIP FOR A MOTOR VEHICLE AND PROFILE STRIP PRODUCTION METHOD

CROSS REFERENCES TO RELATED APPLICATIONS

This application is a continuation of international patent application PCT/EP 2017/050 444, filed on Jan. 11, 2017, which claims the priority of German patent application DE 10 2016 101 312.9, filed on Jan. 26, 2016, the entire content of these earlier applications being incorporated herein by reference.

BACKGROUND

The present invention relates to a profile strip for a motor vehicle, in particular for a sealing assembly in a window or door area of a motor vehicle, comprising a securing profile section that can be secured on a first part of the motor vehicle and a sealing profile section that is connected to the securing profile section and is produced from a vulcanized rubber matrix and configured to allow relative movements with reduced friction between the profile strip and a second part of the motor vehicle, wherein a contact surface of the sealing profile section that can be brought into contact with the second part is provided with an anti-friction coating that comprises an anti-friction coating matrix and anti-friction particles embedded in the anti-friction coating matrix that are produced from ultra-high-molecular-weight polyethylene (UHMWPE).

The present invention further relates to a method for producing a profile strip for a motor vehicle and a method for producing a sealing assembly for a motor vehicle that uses such a profile strip.

Profile strips of the type mentioned above are used in particular for the sealing of windows, doors, covers, or hoods of a motor vehicle. In this case, the securing profile section is ordinarily secured on a body-mounted part of the motor vehicle. The profile strip is configured such that its sealing profile section can lie with one contact surface against a part of the motor vehicle that is moveable with respect to the body. For example, this part of the motor vehicle can be a side window that can be retracted into a window recess, but it can also be a door that is sealed on its outer periphery with respect to a door opening. Moreover, the movable part can be a trunk lid, an engine hood, or the like. However, these example applications for profile strips are to be understood purely as examples. The profile strip can also be used for other sealing purposes between two parts that are moveable relative to one another.

In the field of sealing assemblies for motor vehicles, one generally distinguishes between two types of profile strips, the first being those based on an elastically deformable thermoplastic material that is not crosslinked, i.e. is remeltable. Such materials are relatively inexpensive and are insensitive. Alternatively, such profile strips are based on crosslinked rubber, in particular ethylene-propylene diene monomer (EPDM). The elastic properties of EPDM are superior to those of thermoplastic elastomers (TPE). EPDM is a high-quality synthetic rubber type with high resistance to chemicals, UV radiation, and also to weather influences.

The production methods for TPE on the one hand and EPDM (or other crosslinked rubber materials) on the other differ considerably.

EPDM materials are generally first extruded at approximately 90° C. to 110° C. The temperature is then increased to as high as 200° C. in order to crosslink said EPDM materials (for example by sulfur crosslinking).

In contrast, the thermoplastic material of thermoplastic elastomers ordinarily does not melt at 100° C., melting only at temperatures in the area of 200° C.

Despite these fundamental differences with respect to workability, it is possible to apply an anti-friction coating based on a thermoplastic material in which anti-friction particles are embedded to a crosslinked sealing profile section composed of EPDM.

In this case, the anti-friction particles on the contact surface of the sealing profile section make it possible for an extremely low coefficient of friction to be present between the contact surface and the part of the motor vehicle in contact therewith, and said coefficient can for example be less than 0.5 and can reach values as low as 0.15.

In many cases, profile strips are placed in an injection mold after being produced in order to spray further sealing features onto the profile strip, with said features more specifically being composed of thermoplastic resins or EPDM.

In a profile strip composed of EPDM to which an anti-friction coating based on a thermoplastic resin has been applied, these additional sealing features must then also be produced from thermoplastic resin material.

It is problematic in this case that high temperatures can occur in injection molds, which can cause the TP anti-friction coating to melt on the surface, possibly causing optical and/or functional drawbacks.

Other possibilities for keeping frictional resistance in the area of a contact surface of a sealing profile section low are as follows.

First, an anti-friction lacquer can be applied to a sealing profile section in the area of a contact surface. The dimensional stability thereof in hot molds such as injection molds is excellent. However, separate process steps are necessary. The freezing properties are good to excellent, and the noise characteristics and durability in endurance testing are good to satisfactory. As a rule, however, adhesion to the sealing profile section is unsatisfactory.

A further possibility lies in flocking of the contact surface. In this case, dimensional stability in hot molds is relatively poor. In addition, the product properties are unsatisfactory in many respects, in particular with respect to freezing properties and noise characteristics in warm and humid climates. Adhesion to the substrate is also satisfactory to poor at best.

A further possibility lies in applying a film to the sealing profile section that in particular can be produced from ultra-high-molecular-weight PE (UHMWPE). In this case, the product properties are excellent. However, a costly separate process step is required in which high reject costs are to be expected.

An anti-friction coating of the above-described type with anti-friction particles embedded in a thermoplastic matrix also shows excellent product properties, but entails the above-described problems with respect to dimensional stability in hot molds and shaping in the mold.

SUMMARY

Against this background, the object of the invention is to provide an improved profile strip for a motor vehicle, an improved method for producing such a profile strip, and an improved method for producing a sealing assembly for a motor vehicle.

The profile strip mentioned at the outset achieves this object in that the anti-friction coating matrix is a vulcanized ERMA matrix.

The above object is further achieved by a method for producing a profile strip for a motor vehicle, in particular a profile strip according to the invention, comprising the steps of providing a rubber material composed of a first mixture, more particularly for a sealing profile section of the profile strip, providing an EPDM material composed of a second mixture wherein the EPDM material comprises an EPDM matrix and anti-friction particles composed of UHMWPE, more particularly for an anti-friction coating of the sealing profile section, and co-extruding the rubber and the EPDM material so that a profile strip is formed, comprising a sealing profile section made of the rubber material, and an anti-friction coating on a contact surface of the sealing profile section.

Finally, the above object is achieved by a method for producing a sealing assembly for a motor vehicle comprising the steps of providing a profile strip according to the invention or producing a profile strip according to the profile strip production method of the invention, wherein the rubber material of the sealing profile section is a further EPDM material that is vulcanized after the co-extrusion step together with the EPDM material of the anti-friction coating, and wherein the method for producing a sealing assembly comprises the further steps of placing the profile strip in an injection mold and injection molding onto the profile strip of at least one sealing feature composed of an EPDM injection-mold material.

On the one hand, a profile strip with an anti-friction coating matrix composed of a vulcanized EPDM matrix has highly favorable product properties. Its freezing properties, noise characteristics, durability in endurance testing, and adhesion to the substrate (the vulcanized rubber matrix of the sealing profile section) are all highly favorable.

Moreover, no separate in-line process step is required. Excellent dimensional stability in hot molds is also achieved, wherein sealing features composed of an EPDM injection-mold material can be injection molded to profile strip. Furthermore, the anti-friction coating can be applied in the mold, in particular by co-extrusion of the rubber material of the sealing profile section and the EPDM material of the anti-friction coating. The profile strip as a whole can be composed of crosslinked matrix material, so that the profile strip as a whole is thermally stable.

The anti-friction particles composed of UHMWPE provide a low coefficient of friction between the contact surface and the second part of the motor vehicle (e.g. window). The anti-friction particles composed of UHMWPE further have hydrophobic properties. In particular, the anti-friction particles are anti-friction particles of an essentially spherical shape.

In injection molding on of sealing features composed of the EPDM injection-molded material, it is true that the anti-friction particles may melt or fuse. Because of the ultra-high-molecular-weight material, however, the most that will happen in such a case is conversion from a crystalline to an amorphous form, so that even in the case of melting, the general form will be retained due to the high surface tension. In other words, the properties of the anti-friction particles that are essential for the anti-friction coating will be impaired only slightly or not at all in injection molding on of sealing features composed of an EPDM injection-molded material. The bilk density of the anti-friction particles used is generally ≥0.4 g/cm3.

In co-extruding, there is generally no or only negligible chemical bonding between the rubber and the EPDM material of the anti-friction coating. The connection between these materials is a technical connection that appears in a sectional image as a separating layer.

The product properties of the anti-friction particles composed of UHMWPE can be found in the brochure "Special Products-GUR® UHMWPE Products as Rubber Additives-Product Information," Celanese copyright 2013, or in the accompanying document EP 1342751 B1.

The object is completely achieved overall.

In a preferred embodiment of the profile strip, the anti-friction coating matrix is produced from an EPDM mixture comprising the following components: 20 wt % to 40 wt % of EPDM and 5 wt % to 50 wt % of anti-friction particles, and (an) additive(s) and/or crosslinking agent(s) as the remainder.

It is particularly preferred if the EPDM mixture comprises EPDM in an amount of 20 wt % to 30 wt %, in particular in the range of 20 wt % to 26 wt %. It is further preferred if the EPDM mixture of the anti-friction coating comprises 4 wt % to 40 wt % of anti-friction particles, in particular 4 wt % to 38 wt %, and particularly preferably 25 wt % to 35 wt %, in each case including the specified limit values.

The additive or additives can be selected from one or a plurality of the following components: carbon black, PE wax, paraffin oil, stearic acid, high-molecular-weight polyethylene glycol (PEG), zinc oxide, a sulfur-characteristic and NO-free acceleration system, and calcium oxide (CaO).

It is particularly advantageous if the EPDM mixture comprises 20 wt % to 50 wt % of carbon black, 1 wt % to 30 wt % of thermoplastic olefinic synthetic resin, and/or 2 wt % to 15 wt % of oil as (an) additive(s), and/or wherein the EPDM mixture comprises crosslinking agent(s) as the remainder.

It is particularly preferred in this case if the amount of thermoplastic olefinic synthetic resin is in the range of 3 wt % to 20 wt %, in particular 4 wt % to 15 wt %, wherein the synthetic resin is preferably a PE wax, more particularly in the form of a PE homopolymer with a dropping point of 106° C.

In addition, it is preferred if the EPDM mixture contains oil in an amount of 5 wt % to 12 wt %, in particular in an amount of 6 wt % to 10 wt %.

In particular, the oil can be a paraffin oil.

Stearic acid is preferably contained in the EPDM mixture in an amount of less than 2 wt %. The same applies for polyethylene glycol, zinc oxide, the acceleration system, and calcium oxide.

It is further preferred if a crosslinking agent such as sulfur is present as the remainder, with this agent being present in the EPDM mixture in a wt % amount of less than 2 wt %. The sulfur can be added in an amount of 0.5 to 2 parts per hundred rubber (phr).

Moreover, it is preferred overall if the vulcanized anti-friction coating EPDM matrix has a higher strength and/or stiffness and/or hardness and/or a higher modulus than the vulcanized rubber matrix of the sealing profile section.

In this manner, the anti-friction particles of the anti-friction coating can be securely anchored in the anti-friction coating EPDM matrix, i.e. so that it does not tear out or lose anti-friction particles in any other manner.

In this case, it is particularly preferred if the anti-friction coating EPDM matrix has a Shore A hardness in the range of 75 to 98, in particular in the range of 85 to 97, and/or a tensile strength in the range of 5 $N/mm^2$ to 8 $N/mm^2$, in particular in the range of 6 $N/mm^2$ to 7.5 $N/mm^2$.

The rubber matrix of the sealing profile section preferably has a Shore A hardness in the range of 45 to 74, in particular a Shore A hardness in the range of 50 to 70.

The ratio of the Shore A hardness of the anti-friction coating EPDM matrix to that of the rubber matrix of the sealing profile section is preferably in the range of 1.2 to 1.5, in particular 1.3 to 1.4.

Moreover, it is advantageous overall if the anti-friction coating has a thickness in the range of 0.05 mm to 0.5 mm.

In addition, it is advantageous if the anti-friction particles have an average diameter in the range of 20 μm to 200 μm, in particular in the range of 50 μm to 150 μm, and in particular in the range of 80 μm to 120 μm. As mentioned above, the anti-friction particles preferably have an at least approximately spherical shape.

Furthermore, it is advantageous if the sealing profile section is produced from a vulcanized EPDM matrix that is preferably simultaneously subjected to primary molding and/or vulcanization with the anti-friction coating EPDM matrix.

On the one hand, this allows the profile strip to be inexpensively produced, as the same type of mold can be used for primary molding and/or the same type of treatment can be used for vulcanization.

It is particularly advantageous if the sealing profile section and the anti-friction coating are co-extruded.

Overall, at least one of the following advantages and/or at least one of the following features is/are realized by means of the invention.

The anti-friction coating is preferably a co-extrudable anti-friction coating with a low coefficient of friction against glass (for example in the area of less than 0.4, and preferably less than 0.25).

The anti-friction coating further has a high abrasion resistance and is thermally fixed by crosslinking. As a result, the anti-friction coating does not melt or change its form, even on hot surfaces such as injection molds. Because of the EPDM matrix of the anti-friction coating, it shows excellent adhesion to EPDM substrates on profiles or preforms. Excellent anti-friction properties are achieved by means of a high filling ratio with anti-friction particles composed of UHMWPE in a suitable hard EPDM-mixture matrix.

The anti-friction coating further provides the advantage of allowing high sealability and low noise levels on movement relative to the second part of the motor vehicle to be achieved. In addition, the profile strip can be produced inexpensively overall.

Overall, therefore, the anti-friction coating is produced by combining a crosslinked EPDM matrix, which as a result is thermally stable, with fillers in the form of anti-friction particles that show a low coefficient of friction and/or possess hydrophobic properties.

The anti-friction particles are contained in the anti-friction coating matrix with a very high filling ratio, more specifically preferably at least 25 wt % to 50 wt %, as discussed above.

Moreover, the EPDM matrix of the anti-friction coating is provided with an extremely high modulus or high hardness. The use of EPDM with a diene component makes sulfur crosslinking possible. The result is an anti-friction coating material class that is geometrically stable after crosslinking, more specifically with respect to thermal effects as well. Moreover, additives comprising an oil, such as a paraffin oil or silicone oil, show excellent properties with respect to abrasion resistance.

In particular, the EPDM material is an EPDM material with a high C2 value. Moreover, it is particularly preferable for the profile strip to be producible on a production line for EPDM and to be fully compatible therewith. Mixing of EPDM with thermoplastic sections in the form of co-extrusion is avoided so that process costs overall can be reduced, in addition, the profile strip can also show a high degree of elasticity hi the area of the sealing profile section.

In addition to the above indications with respect to hardness and tensile strength, the EPDM matrix of the anti-friction coating strength preferably has a specific density in the range of 0.9 to 1.2 g/cm3. The elongation is preferably 100 to 120%.

The static coefficient of friction against glass is preferably in the range of 0.2 to 0.3, and the dynamic coefficient of friction against glass is preferably in the range of 0.18 to 0.25.

The Mooney viscosity (at 121° C.) is preferably hi the range of 7 MU to 11 MU. The compression set in the X-Y direction after 22 hours at 70° C. is in the range of 80% to 90%.

In the present case, all of the indicated ranges include the respectively indicated limit values.

It is to be understood that the features mentioned above and to be explained below are useable not only in the respectively given combination, but also in other combinations or individually, without departing from the scope of the present invention.

BRIEF DESCRIPTION OF THE SEVERAL VIEWS OF THE DRAWING

Examples of the invention are shown in the drawings and will be described in further detail in the following description. The figures show the following.

EMBODIMENTS

Figure 1:
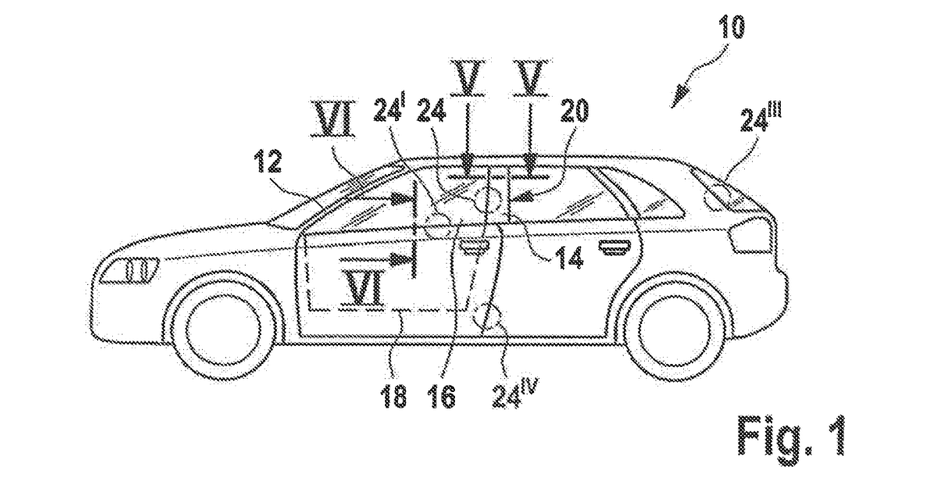
FIG. 1 is a schematic representation of a motor vehicle in which one or a plurality of sealing assemblies having profile strips according to the invention are installed.

FIG. 1 is a schematic representation of a motor vehicle in the form of a passenger vehicle and given the general reference number 10.

The motor vehicle 10 comprises a body, which contains in a manner known per se an A column 12 and a B column 14 in a passenger compartment, as well as a C column not shown in further detail. In the area of the columns, vertically displaceable windows 16 are provided on the vehicle, which for example can be withdrawn into a window recess 18 shown schematically.

The body of the motor vehicle 10 further comprises body parts 20 such as a B column cover or a door or the like, with sealing to be carried out between said parts and a window 16 in the form of schematically shown sealing assemblies 24, 24'.

FIG. 1 further shows that such sealing assemblies can also be provided in the area between a door and a fixed part of the body (24IV), and between fixed parts of the body and an engine hood (24") and/or a trunk lid or a tailgate (24''').

Figure 2:
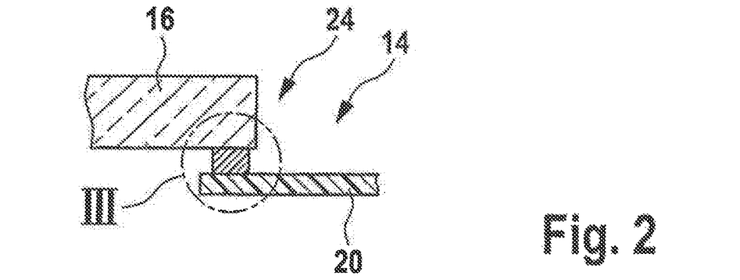
FIG. 2 shows a schematic view of a sealing assembly with a profile strip according to the invention.

FIG. 2 shows a first such sealing assembly 24, which is disposed for example between a body part such as a B column cover 20 of a door and a window 16 that is displaceable relative thereto.

Figure 3:
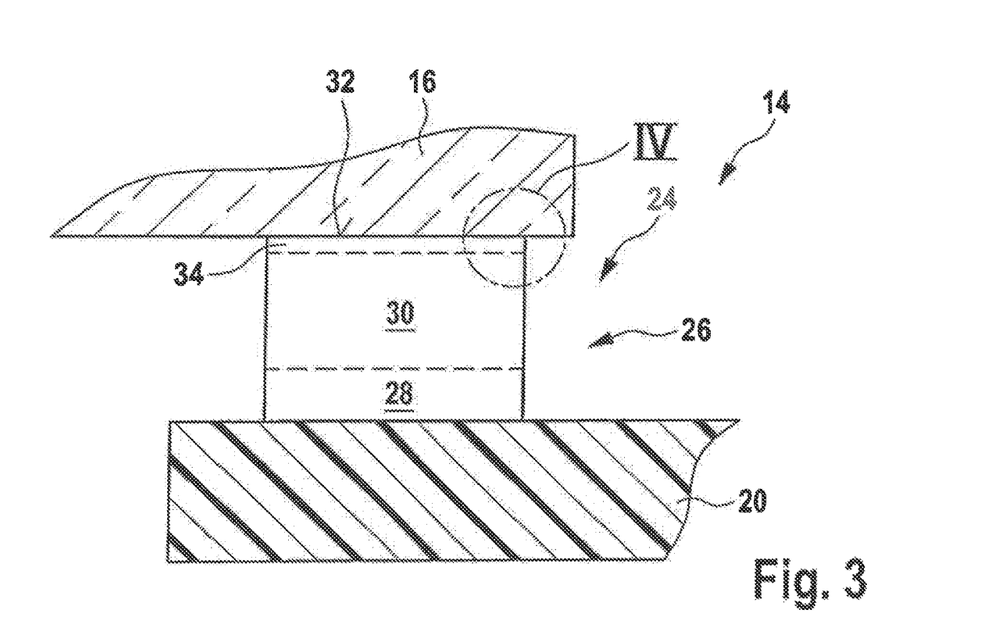
FIG. 3 is a schematic enlarged view of a detail III of FIG. 2.

FIG. 3 shows a detail view of this sealing assembly 24.

It can be seen that sealing assembly 24 can essentially be formed by a profile strip 26, which is shown in FIGS. 2 and 3 in a cross-sectional view.

The profile strip 26 comprises a securing profile section 28 that is secured on the fixed part of the body (e.g. B column cover) 20. In the present context, the type of securing is not important. This can be an adhesive connection, a press connection, or the like.

The profile strip 26 further comprises a sealing profile section 30 that is disposed on a side of the securing profile section 28 opposite the body part 20, more particularly on the side facing the window 16. The sealing profile section 30 and the securing profile section 28 are each produced from a vulcanized rubber material, in particular a vulcanized EPDM material. The sealing profile section 30 and the securing profile section 28 can be produced from identical EPDM materials, but are preferably produced from different EPDM materials. The sealing profile section 30 and the securing profile section 28 can preferably simultaneously be subjected to primary molding and/or vulcanization, in particular by co-extrusion.

The sealing profile section 30 comprises a contact surface 32 that lies against the window 16.

The sealing profile section 30 is coated in the area of the contact surface 32, at least in sections, with an anti-friction coating 34.

Figure 4:
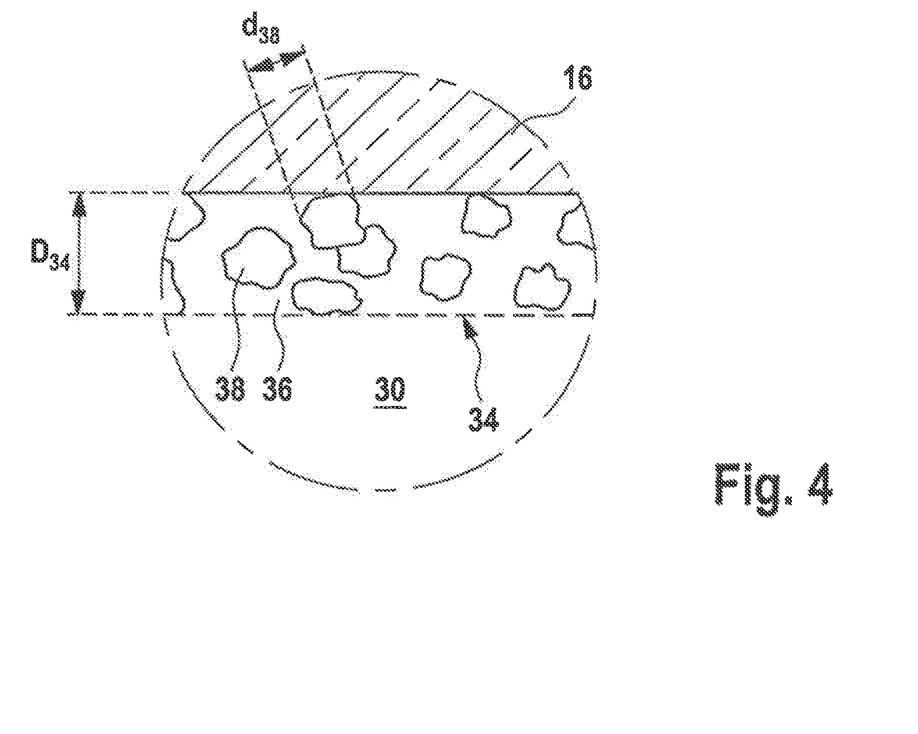
FIG. 4 is a schematic enlarged view of a detail IV of FIG. 3.

The anti-friction coating 34, as can be seen in the enlarged schematic representation of FIG. 4, comprises an anti-friction coating matrix in the form of a vulcanized EPDM matrix 36 and anti-friction particles 38.

The anti-friction coating 34 has an average material thickness or thickness D34 in the range of 0.05 mm to 0.5 mm. The anti-friction particles 38 embedded in the EPDM matrix 36 preferably have a diameter d38 in the range of 20 μm to 200 μm.

The anti-friction coating matrix 36 is preferably composed of an EPDM mixture comprising the following components: 20 wt % to 40 wt % of EPDM and 3 wt % to 50 wt % of anti-friction particles, and (an) additive(s) and/or crosslinking agent(s) as the remainder.

Moreover, it is advantageous if the EPDM mixture comprises 20 wt % to 50 wt % of carbon black, 1 wt % to 30 wt % of thermoplastic olefinic synthetic resin and/or 2 wt % to 15 wt % of oil as (an) additive(s) and/or if the EPDM mixture comprises crosslinking agent(s) as the remainder.

The crosslinking agent is preferably sulfur. The carbon black can be any desired carbon black that is useable as a filler material in rubber components, preferably of the type FEF.

The thermoplastic olefinic synthetic resin can be composed of any type of polypropylene (PP) and polyethylene (PE) resins, preferably LDPE and/or PE waxes The anti-friction coating EPDM matrix 36 preferably shows a higher strength and/or hardness or stiffness and/or a higher modulus than the EPDM matrix of the sealing profile section 30.

The anti-friction coating EPDM matrix preferably shows a Shore A hardness in the range of 75 to 98 and/or a tensile strength in the range of 5 N/mm$^2$ to 8 N/mm$^2$.

It is particularly preferred if the anti-friction coating shows a relatively high filling ratio of anti-friction particles that is preferably greater than 25%, in particular greater than 30%.

Figure 5:
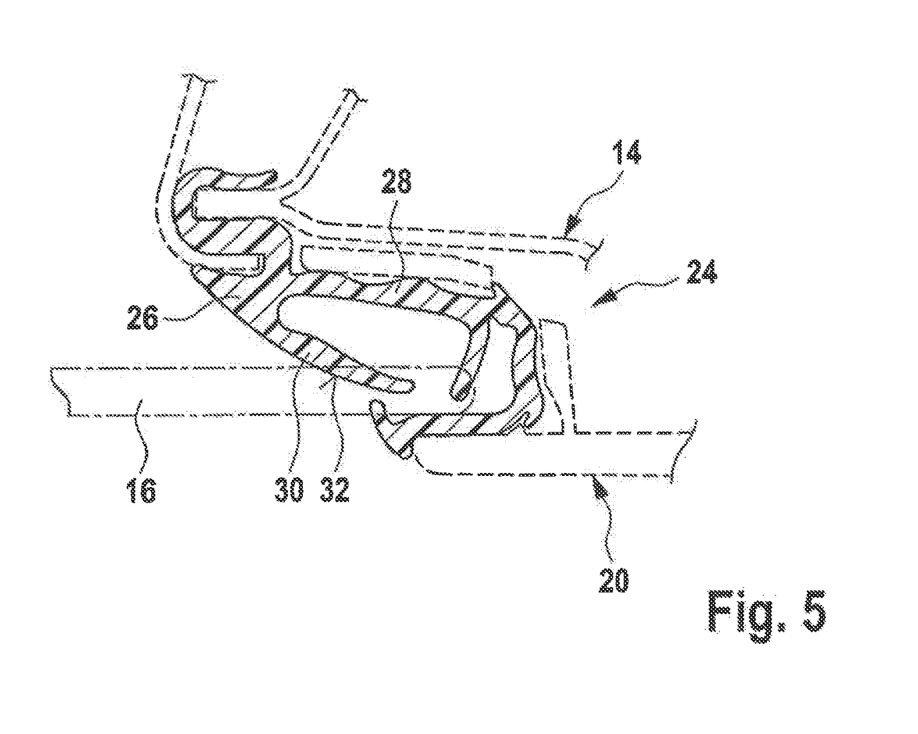
FIG. 5 is a schematic representation of a further embodiment of a profile strip according to the invention in a sectional view along line V-V of FIG. 1.

FIG. 5 shows a further embodiment of a profile strip 26 of a sealing assembly 24 for sealing in the area of a B column 14. The profile strip 26 comprises a securing profile section 28 that is secured on a composite sheet material of the B column 14, for example by being slid or clamped into place, and moreover is in contact with a B column cover 20.

The profile strip 26 comprises a sealing profile section 30 that extends from the securing profile section 28 in the form of a lip and has a contact surface 32 that is in contact with the window 16, wherein the contact surface 32 is coated, at least in sections, with an anti-friction coating that is not further specified.

Figure 6:
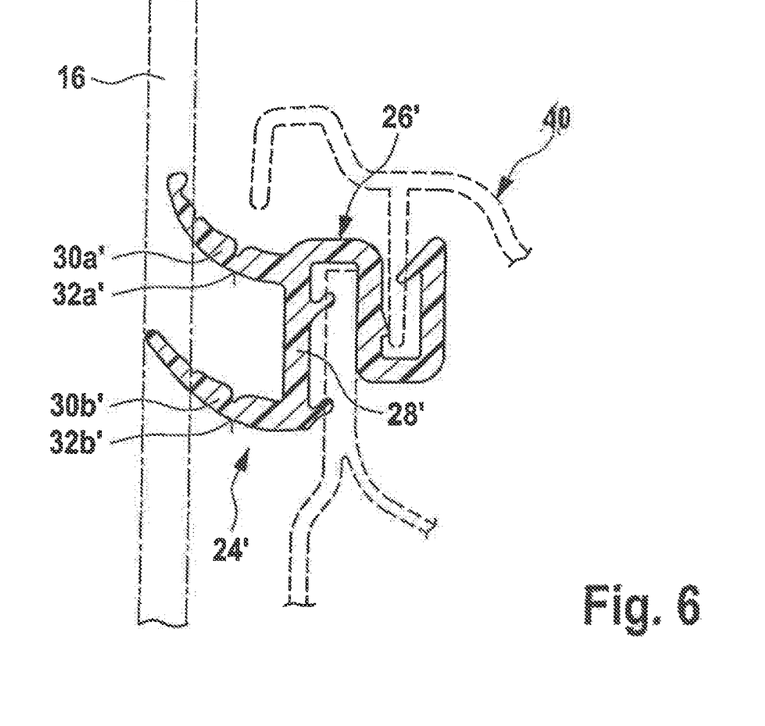
FIG. 6 is a schematic representation of a further embodiment of a profile strip according to the invention in a sectional view along line VI-VI of FIG. 1.

FIG. 6 shows a further embodiment of a profile strip 26' of a sealing assembly 24' for sealing a window recess. In this case, the securing profile section 28' is configured to be slid onto an edge of the body door panel 40.

The profile strip 26' further comprises two sealing profile sections 30a', 30b' that extend respectively as lips from the securing profile section 28', more specifically essentially parallel to each other. Each of the sealing profile sections 30a', 30b' has a corresponding contact surface 32a', 32b' provided with an anti-friction coating that is not further specified, which can have a structure identical to the above-described anti-friction coating 34.

Figure 7:
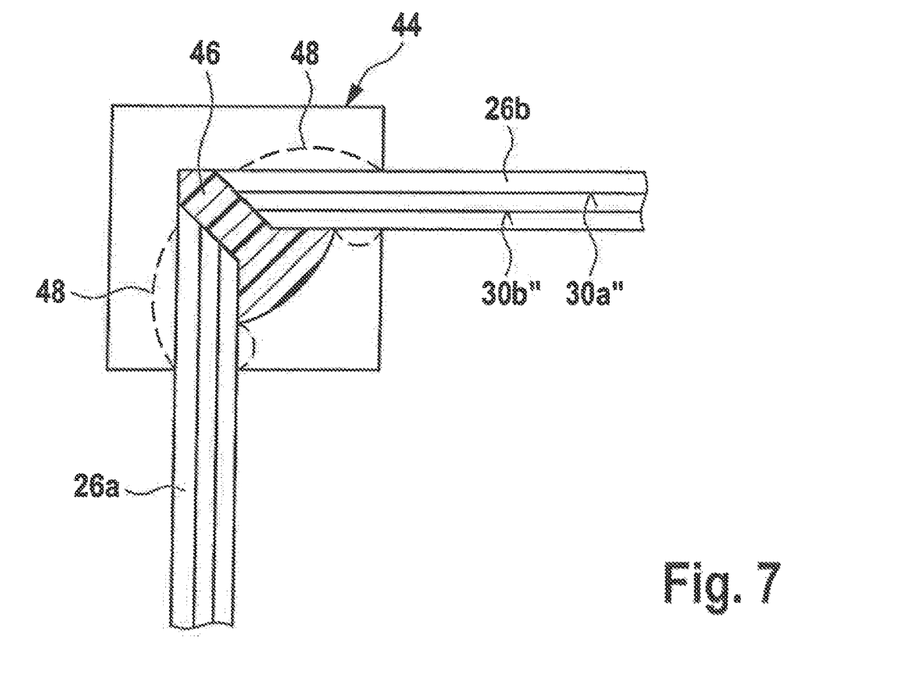
FIG. 7 is a schematic representation of an injection mold having an inserted profile strip and further sealing features injection molded thereto.

FIG. 7 shows a schematic view of an injection mold 44 in which a finished profile strip, or as shown in the present case, two profile strips 26a, 26b, is/are placed. Each of the profile strips comprises a crosslinked securing profile section, a crosslinked sealing profile section, and a crosslinked or vulcanized anti-friction coating EPDM matrix. More specifically, the profile sections 26a, 26b in the present case comprise respectively parallel sealing profile sections 30a", 30b" that can be configured as parallel lips as shown in the embodiment of FIG. 6.

A further sealing feature 46 is injection-molded on between the profile strips 26a, 26b, which are configured for example for a corner area of a window. The further sealing feature 46 constitutes a corner area of this sealing assembly and is preferably also produced from an EPDM material, which is preferably vulcanized after being injection-molded thereto.

FIG. 7 further shows that the profile sections 26a, 26b are held inside the injection mold 44 in schematically indicated damping areas 48. Because of the properties of the anti-friction coating applied according to the invention and the fact that the profile strip is thermally stable overall because of its crosslinking, the sealing feature 46 or optionally further sealing features 46 can be injection-molded essentially without impairing the surface quality of the profile strips 26a, 26b.

The injection-molded sealing features 46 preferably show lower strength or hardness and a lower modulus than the vulcanized anti-friction coating EPDM matrix.

The anti-friction coating is preferably produced with components such as those shown above. As a supplementary disclosure, two examples are disclosed below:

Example 1

| Components | phr | wt % |
|---|---|---|
| EPDM | 100.0 | 24 |
| Carbon black of the type FEF N-550 | 200.0 | 48 |
| PE wax (PE homopolymer, dropping point 106° C.) | 50.0 | 12 |
| UHMWPE particles, solid, spherical, average diameter 100 μm | 20.0 | 5 |
| Paraffin oil of the type SN 550 | 30.0 | 7 |
| Stearic acid | 1.0 | 0 |
| Polyethylene glycol (PEG 4000) | 1.0 | 0 |
| ZnO$_{active}$ | 4.0 | 1 |
| Sulfur | 1.0 | 0 |
| Acceleration system, S-characteristic, NO-free | 6.0 | 1 |
| CaO | 3.5 | 1 |
| phr$_{total}$ | 416.5 | 100.0 |

Example 2

| Components | phr | wt % |
|---|---|---|
| EPDM | 100.0 | 23 |
| Carbon black of the type FEF N-550 | 100.0 | 23 |
| PE wax (PE homopolymer, dropping point 106° C.) | 20.0 | 5 |
| UHMWPE particles, solid, spherical, average diameter 100 μm | 150.0 | 35 |
| Paraffin oil of the type SN 550 | 40.0 | 9 |
| Stearic acid | 1.0 | 0 |
| Polyethylene glycol (PEG 4000) | 1.0 | 0 |
| ZnO$_{active}$ | 4.0 | 1 |
| Sulfur | 1.0 | 0 |
| Acceleration system, S-characteristic, NO-free | 6.0 | 1 |
| CaO | 3.5 | 1 |
| phr$_{total}$ | 426.5 | 100.0 |

What is claimed is:

1. A profile strip for a motor vehicle, comprising:
a securing profile section that can be secured on a first part of the motor vehicle, and
a sealing profile section connected to the securing profile section, produced from a vulcanized rubber matrix and configured to allow relative movements with reduced friction between the profile strip and a second part of the motor vehicle, wherein a contact surface of the sealing profile section that can be brought into contact with the second part is provided with an anti-friction coating that comprises an anti-friction coating matrix and anti-friction particles embedded in the anti-friction coating matrix that are produced from ultra-high-molecular-weight polyethylene (UHMWPE),
wherein the anti-friction coating matrix is a vulcanized ethylene-propylene diene monomer (EPDM) matrix,
wherein the sealing profile section and the anti-friction coating are co-extruded so that a vulcanization of the vulcanized EPDM matrix is made during a co-extrusion step,
wherein the anti-friction coating vulcanized EPDM matrix has a Shore A hardness in the range of 75 to 98, and
wherein the anti-friction coating is formed directly on the vulcanized rubber matrix of the sealing profile section.

2. The profile strip as claimed in claim 1, wherein the anti-friction coating vulcanized EPDM matrix has a higher strength than the vulcanized rubber matrix of the sealing profile section.

3. The profile strip as claimed in claim 1, wherein the anti-friction coating vulcanized EPDM matrix has at least one of a higher stiffness and a higher modulus than the vulcanized rubber matrix of the sealing profile section.

4. The profile strip as claimed in claim 1, wherein the anti-friction coating vulcanized EPDM matrix has a tensile strength in the range of 5 N/mm$^2$ to 8 N/mm$^2$.

5. The profile strip as claimed in claim 1, wherein the anti-friction coating has a thickness in the range of 0.05 mm to 0.5 mm.

6. The profile strip as claimed in claim 1, wherein the anti-friction particles have an average diameter in the range of 20 μm to 200 μm.

7. The profile strip as claimed in claim 1, wherein the vulcanized rubber matrix of the sealing profile section is produced from a vulcanized EPDM matrix.

8. The profile strip as claimed in claim 7, wherein the vulcanized EPDM matrix is simultaneously subjected to at least one of primary molding and vulcanization with the anti-friction coating vulcanized EPDM matrix.

9. The profile strip as claimed in claim 1, wherein a ratio of a Shore A hardness of the anti-friction coating vulcanized EPDM matrix to that of the rubber matrix of the sealing profile section is in the range of 1.2 to 1.5.

10. The profile strip as claimed in claim 1, wherein the anti-friction coating is produced from an EPDM mixture that comprises the following components: 20 wt % to 40 wt % of the anti-friction coating matrix, which is EPDM, 3 wt % to 50 wt % of the anti-friction particles, and as the remainder, at least one of at least one additive and at least one crosslinking agent.

11. The profile strip as claimed in claim 10, wherein the EPDM mixture comprises at least one of 20 wt % to 50 wt % of carbon black, 1 wt % to 30 wt % of thermoplastic olefinic synthetic resin and 2 wt % to 15 wt % oil as additive.

12. A profile strip for a motor vehicle, comprising:
a securing profile section that can be secured on a first part of the motor vehicle, and
a sealing profile section connected to the securing profile section, produced from a vulcanized rubber matrix and configured to allow relative movements with reduced friction between the profile strip and a second part of the motor vehicle, wherein a contact surface of the sealing profile section that can be brought into contact with the second part is provided with an anti-friction coating that comprises an anti-friction coating matrix and anti-friction particles embedded in the anti-friction coating matrix that are produced from ultra-high-molecular-weight polyethylene (UHMWPE),
wherein the anti-friction coating matrix is a vulcanized ethylene-propylene diene monomer (EPDM) matrix,
wherein the anti-friction coating is produced from an EPDM mixture that comprises the following components: 20 wt % to 40 wt % of the anti-friction coating matrix, which is EPDM, and 3 wt % to 50 wt % of the anti-friction particles, and
wherein the anti-friction coating is formed directly on the vulcanized rubber matrix of the sealing profile section.

13. The profile strip as claimed in claim 12, wherein the EPDM mixture further comprises at least one of 20 wt % to 50 wt % of carbon black, 1 wt % to 30 wt % of thermoplastic olefinic synthetic resin and 2 wt % to 15 wt % oil.

14. The profile strip as claimed in claim 12, wherein the anti-friction coating vulcanized EPDM matrix has at least one of a higher strength and a higher modulus than the vulcanized rubber matrix of the sealing profile section.

15. The profile strip as claimed in claim 14, wherein the anti-friction coating vulcanized EPDM matrix has at least one of a Shore A hardness in the range of 75 to 98 and a tensile strength in the range of 5 N/mm² to 8 N/mm².

16. The profile strip as claimed in claim 12, wherein the anti-friction coating has a thickness in the range of 0.05 mm to 0.5 mm.

17. The profile strip as claimed in claim 12, wherein the anti-friction particles have an average diameter in the range of 20 μm to 200 μm.

18. The profile strip as claimed in claim 12, wherein the vulcanized rubber matrix of the sealing profile section is produced from a vulcanized EPDM matrix.

19. The profile strip as claimed in claim 12, wherein the sealing profile section and the anti-friction coating are co-extruded.

20. A profile strip for a motor vehicle, comprising:

a securing profile section that can be secured on a first part of the motor vehicle;

a sealing profile section that is connected to the securing profile section, the sealing profile section includes a sealing profile section matrix and a contact surface; and an anti-friction coating that is formed on the contact surface and is configured to allow relative movement with reduced friction between the profile strip and a second part of the motor vehicle, the anti-friction coating includes an anti-friction coating matrix and anti-friction coating particles, wherein each of the sealing profile section matrix and the anti-friction coating matrix includes an ethylene-propylene diene monomer (EPDM) material, the anti-friction coating particles are embedded in the anti-friction coating matrix and include ultra-high-molecular-weight polyethylene (UHMWPE), and the sealing profile section matrix and the anti-friction coating matrix are co-extruded so that the anti-friction coating is formed directly on the contact surface while the (EPDM) material of the anti-friction coating matrix is vulcanized.

* * * * *